United States Patent
Cooke et al.

[15] 3,687,973
[45] Aug. 29, 1972

[54] SUBSTITUTED-4-ANILINO PYRROLINES

[72] Inventors: George A. Cooke, Denville, N.J.; Rudolf G. Griot, Basel-Stadt, Switzerland

[73] Assignee: Sandoz-Wander Inc., Hanover, N.J.

[22] Filed: Oct. 30, 1969

[21] Appl. No.: 872,729

[52] U.S. Cl. ................................260/326.3, 424/274
[51] Int. Cl. .............................................C07d 27/14
[58] Field of Search.....................................260/326.3

[56] References Cited

UNITED STATES PATENTS 3,510,493  5/1970  Rynbrandt..........260/326.5 X

OTHER PUBLICATIONS

Wagner et al. Synthetic Organic Chemistry (1953) p. 682
Sheradsky et al. Chem. Abs. vol. 66: 94990k (1967)

*Primary Examiner*—Alex Mazel
*Assistant Examiner*—Joseph A. Narcavage
*Attorney*—Gerald D. Sharkin, Frederick H. Weinfeldt, Robert S. Honor, Walter F. Jewell and Richard E. Vila

[57] ABSTRACT

Substituted 4-anilino pyrrolines, e.g., 1-acetyl-4-(p-nitroanilino) 3-pyrroline-3-carboxylic acid ethyl ester, are prepared by treating corresponding 4-oxo-pyrrolines with an appropriate aniline. The compounds are useful as central nervous system depressants.

8 Claims, No Drawings

SUBSTITUTED-4-ANILINO PYRROLINES

This invention relates to substituted-4-anilino pyrrolines, and more particularly to 1-alkanoyl-4-anilino-3-pyrroline-3-carboxylic acid esters, acid addition salts thereof, and processes for their preparation.

The substituted pyrrolines of this invention may be represented by the formula

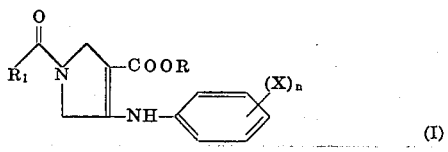

where
R and $R_1$, independently, represents straight chain lower alkyl, i.e., straight chain lower alkyl of 1–5 carbon atoms, e.g. methyl, ethyl or propyl,
each X, independently represents hydrogen, nitro, lower alkyl, lower alkylthio, lower alkoxy, trifluoromethyl or halo having an atomic weight of about 19–80, where "lower" represents 1–5 carbon atoms thereby including such groups, for instance as methyl, ethyl, isopropyl, methoxy, propoxy, methylthio, alkylthio, butylthio, and the like,
$n$ represents 1 and 2, or
$(X)n$ represents a methylenedioxy group on adjacent carbon atoms,
provided two trifluoromethyl or nitro groups or a trifluoromethyl and a nitro group are not on adjacent carbon atoms.

The compounds of formula (I) are prepared by treating a compound of the formula (II), which can also exist in tautomeric form (IIa).

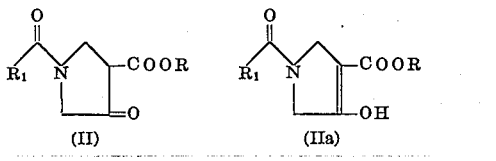

with a compound of the formula

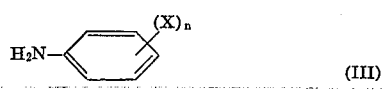

where R, $R_1$, X and $n$ are as previously defined, in an inert solvent such as lower alkanols, e.g. methanol, ethanol, or isopropanol, hydrocarbons, such as benzene, toluene or xylene, ethers such as ethyl ether or tetrahydrofuran, and the like.

As will be appreciated by those skilled in the art, whether the compounds of formula (II) or (IIa) exist at any particular time will depend upon such factors as the pH of the environment and the particular solvents used. For the sake of simplicity, only the compounds of formula (II) will be specifically referred to.

The above condensation reaction is performed at a temperature of from about room temperature to about 125°C., preferably 60°–80°C., conveniently at the reflux temperature of the system, for a period from about 2–64 hours, generally about 10–20 hours. Neither the reaction temperature nor the solvents used are critical in obtaining the product (I). Conventional techniques such as concentration, filtration and recrystallization may be used to recover the product.

Some of the compounds of formulas (II) and (III), are known and may be prepared according to methods disclosed in the literature. Those compounds (II) and (III) not specifically disclosed may be prepared using analogous methods from known materials.

The compounds of formula (I) are useful because they possess pharmacological activity in animals. In particular, they have central nervous system (CNS) activity and may be used as CNS depressants as indicated by their activity in mice given about 200 mg/kg of active agent and tested using the 30-word adjective check sheet system basically described by S. Irwin (Gordon Research Conference, Medicinal Chemistry, 1959) and Chen (Symposium on Sedative and Hypnotic Drugs, Williams and Wilkins, 1954).

Moreover, the compound of Example I is useful as a tranquilizer as indicated by its ability to antagonize amphetamine induced stimulation in mice, wherein the mice are each given 2.5 mg/kg of body weight of amphetamine sulfate and about 20 mg/kg i.p. of active agent. The locomotor activity of the mice is then measured for an 80 minute period at 10 minute intervals with an actophotometer.

The compound of Example I is also active as a memory enhancer as indicated by its activity in mice administered 4 mg/kg, p.o., and tested for passive avoidance behavior utilizing foot applied grid shock.

For all of these uses the compounds (I) or the compound of Example I, as the case may be, may be combined with one or more pharmaceutically acceptable carriers of adjuvants. They may be administered orally or parenterally and, depending upon the compound employed and the mode of administration, the exact dosage utilized may vary.

Furthermore, the compounds of formula (I) may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate benzene-sulfonate and the like.

In general, satisfactory results are obtained when the compound indicated for use as a memory enhancer and tranquilizer is administered at a daily dosage of about 1 milligram to about 150 milligrams per kilogram orally of animal body weight. This daily dosage is preferably administered 2 to 4 times a day, or in sustained release form. For most large animals such as mammals, the total daily dosage is from about 70 milligrams to about 1,200 milligrams. Dosage forms suitable for internal use comprise from about 15 milligrams to about 600 milligrams of the active compound in intimate admixture with a solid or liquid pharmaceutically acceptable carrier or diluent.

Satisfactory results are also generally obtained when the compounds (I) are administered for the CNS depressant utility at a daily dosage of 10–400 mg/kg orally of animal body weight. This daily dosage is preferably administered 2 to 4 times a day, or in sustained release form. For most large animals such as mammals, the total daily dosage is from about 700–3,000 mg. Dosage forms suitable for internal use comprise from about 150 mg to about 1,500 mg of the active compound in intimate admixture with a solid or liquid pharmaceutically acceptable carrier or diluent.

A representative formulation suitable for oral administration is a tablet prepared by standard tabletting techniques which contains the following.

| Ingredient | Parts of Weight |
| --- | --- |
| 1-acetyl-4-(p-nitroanilino)-3-pyrroline-3-carboxylic acid ethyl ester | 10 |
| tragacanth | 2 |
| lactose | 79.5 |
| corn starch | 5 |
| talcum | 3 |
| magnesium stearate | 0.5 |

The following examples are provided for the purpose of illustration and not by way of limitation. They are not intended so as to limit the scope of the invention as defined in the appended claims.

EXAMPLE 1

1-acetyl-4-(p-nitroanilino)3-pyrroline-3-carboxylic acid ethyl ester

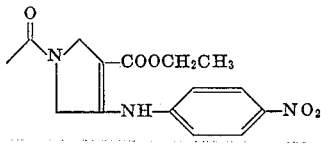

A solution of N-acetylglycine ethyl ester (23 g.) in 65 ml. of dry benzene is added dropwise to a stirred suspension of sodium hydride (28 gms., 55.7 percent in paraffin). The resultant mixture is gently heated to about 40°C. to initiate the reaction, and once initiated, an additional 195 ml. of an acetylglycine ethyl ester (70 g.) in benzene is added at a rate so as to maintain gentle reflux. The reaction mixture is then stirred at room temperature overnight. At the end of this time, 64 gms. of ethyl acrylate is added dropwise over a period of about 20 minutes. The resulting mixture is stirred at room temperature an additional 30 minutes and then refluxed for 2 hours. The reaction mixture is then cooled to room temperature and 302 ml. of 3N hydrochloride acid solution is added with stirring. The organic layer is separated and the aqueous acid solution is extracted three times with 50 ml. of chloroform. The organic layer and the chloroform extracts are admixed, dried and evaporated. The resultant oil is dissolved in 350 ml. of carbon tetrachloride and stored at 0°C. overnight to provide 1-acetyl-4-oxo-pyrrolidine-3-carboxylic acid ethyl ester; melting point 75°–80°C.

To a solution of 12 g. of 1-acetyl-4-oxo-pyrroline-3-carboxylic acid ethyl ester in 150 ml. of absolute ethanol is added 8.4 gms. of p-nitroaniline. The resulting solution is refluxed for 22 hours and the resulting yellow liquid is cooled to room temperature and the precipitated yellow solids are collected by filtration. Recrystallization from absolute methanol provides 1-acetyl-4-(p-nitroanilino)-3-pyrroline-3-carboxylic acid ethyl ester; melting point 197°–199°C.

EXAMPLE 2

1-acetyl-4-(p-chloro anilino)-3-pyrroline-3-carboxylic acid ethyl ester

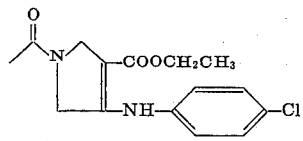

To a solution of 14 g. of 1-acetyl-4-oxo-pyrroline-3-carboxylic acid ethyl ester in 150 ml. of absolute ethanol is added 9.0 g. of p-chloroaniline. The resulting solution is refluxed for 2 hours and the resulting liquid is cooled to room temperature and the precipitated solids are collected by filtration. Recrystallization from absolute methanol provides 1-acetyl-4-(p-chloro anilino)-3-pyrroline-3-carboxylic acid ethyl ester, melting point 142-143°C.

When the above process is carried out and 3,4-dimethoxyaniline is used in place of p-chloroaniline, and have obtained 1-acetyl-4-(3,4-dimethoxyanilino)-3-pyrroline-3-carboxylic acid ethyl ester.

EXAMPLE 3

1-acetyl-4-(p-methoxyanilino)-3-pyrroline-3-carboxylic acid ethyl ester

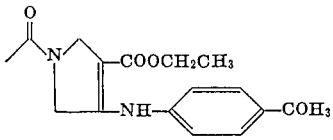

To a solution of 12 g. of 1-acetyl-4-oxo-pyrroline-3-carboxylic acid ethyl ester in 150 ml. of methanol is added 8.7 g. of p-methoxyaniline. The resulting solution is refluxed for 20 hours and the resulting liquid is cooled to room temperature and the precipitated solids are collected by filtration. Recrystallization from absolute ethyl acetate provides 1-acetyl-4-(p-methoxyanilino)-3-pyrroline-3-carboxylic acid ethyl ester; melting point 133°–134°C.

When the above process is carried out and m-toluidine or 3,4-methylenedioxy aniline is used in place of p-methoxyaniline, 1-acetyl-4-(m-methylanilino)-3-pyrroline-3-carboxylic acid ethyl ester or 1-acetyl-4-(3,4-methylenedioxyanilino)-3-pyrroline-3-carboxylic acid ethyl ester, respectively, are obtained.

EXAMPLE 4

1-acetyl-4-(p-methylthioanilino)-3-pyrroline-3-carboxylic acid ethyl ester

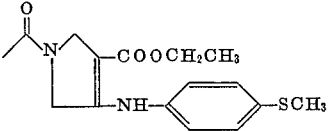

To a solution of 12 g. of 1-acetyl-4-oxo-pyrroline-3-carboxylic acid ethyl ester in 150 ml. of methanol is added 9.8 g. of p-methylthioaniline. The resulting solution is refluxed for 3 hours and the resulting liquid is cooled to room temperature and the precipitated solids are collected by filtration. Recrystallization from absolute methanol provides 1-acetyl-4-(p-methylthioanilino)-3-pyrroline-3-carboxylic acid ethyl ester melting point 133°–135°C.

EXAMPLE 5

1-acetyl-4-(p-trifluoromethylanilino)-3-pyrroline-3-carboxylic acid ethyl ester

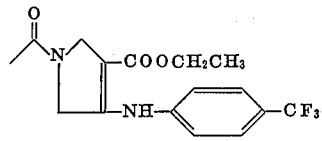

To a solution of 12 g. of 1-acetyl-4-oxo-pyrroline-3-carboxylic acid ethyl ester in 150 ml. of methanol is added 11.4 g. of p-trifluoromethylaniline. The resulting solution is refluxed for 23 hours and the resulting liquid is cooled to room temperature and the precipitated solids are collected by filtration. Recrystallization from absolute methanol provides 1-acetyl-4-(p-trifluoromethylanilino)-3-pyrroline-3-carboxylic acid ethyl ester; melting point 122°–123.5°C.

EXAMPLE 6

1-acetyl-4-(anilino)-3-pyrroline-3-carboxylic acid ethyl ester

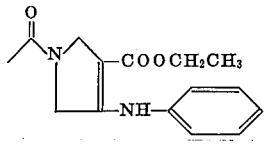

To a solution of 12 g. of 1-acetyl-4-oxo-pyrroline-3-carboxylic acid ethyl ester in 150 ml. of methanol is added 6.6 g. of aniline. The resulting solution is refluxed for 20 hours and the resulting liquid is cooled to room temperature and the precipitated solids are collected by filtration. Recrystallization from dichloromethane-petroleum ether (1:1 v/v) provides 1-acetyl-4-(anilino)-3-pyrroline-3-carboxylic acid ethyl ester; m.p. 119°–121°C.

What is claimed is:
1. A compound of the formula

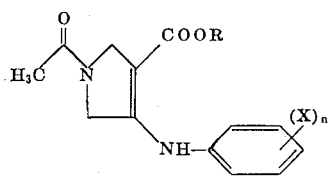

where
R represents straight chain lower alkyl of 1–5 carbon atoms,
each X independently, represents hydrogen, nitro, loweralkyl, lower alkylthio, lower alkoxy, trifluoromethyl or halo having an atomic weight of about 19-80, and
$n$ represents 1 or 2, or
$(X)_n$ represents a methylenedioxy group on adjacent carbon atoms,
provided two trifluoromethyl or nitro groups or a trifluoromethyl and a nitro group are not on adjacent carbon atoms, or a pharmaceutically acceptable acid addition salt thereof.

2. The compound according to claim 1 which is 1-acetyl-4-(p-nitroanilino)-3-pyrroline-3-carboxylic acid ethyl ester.

3. The compound according to claim 1 which is 1-acetyl-4-(p-chloroanilino)-3-pyrroline-3-carboxylic acid ethyl ester.

4. The compound according to claim 1 which is 1-acetyl-4-(3,4-dimethoxyanilino)-3-pyrroline-3-carboxylic acid ethyl ester.

5. The compound according to claim 1 which is 1-acetyl-4-(p-methoxyanilino)-3-pyrroline-3-carboxylic acid ethyl ester.

6. The compound according to claim 1 which is 1-acetyl-4-(p-methylthioanilino)-3-pyrroline-3-carboxylic acid ethyl ester.

7. The compound according to claim 1 which is 1-acetyl-4-(p-trifluoromethylanilino)-3-pyrroline-3-carboxylic acid ethyl ester.

8. The compound according to claim 1 which is 1-acetyl-4-(anilino)-3-pyrroline-3-carboxylic acid ethyl ester.

* * * * *